(12) United States Patent
Martin

(10) Patent No.: US 12,507,676 B2
(45) Date of Patent: Dec. 30, 2025

(54) GAS DISTRIBUTION SYSTEM FOR AQUACULTURE RESERVOIR INCLUDING INTERNAL FLOW CONTROL DEVICE

(71) Applicant: CANADIANPOND.CA PRODUCTS LTD., Lac-Brome (CA)

(72) Inventor: David Martin, Boucherville (CA)

(73) Assignee: CANADIANPOND.CA PRODUCTS LTD., Lac-Brome (Knowlton) (CA)

( * ) Notice: Subject to any disclaimer, the term of this patent is extended or adjusted under 35 U.S.C. 154(b) by 0 days.

(21) Appl. No.: 18/686,306

(22) PCT Filed: Aug. 15, 2022

(86) PCT No.: PCT/CA2022/051234
§ 371 (c)(1),
(2) Date: Feb. 23, 2024

(87) PCT Pub. No.: WO2023/023841
PCT Pub. Date: Mar. 2, 2023

(65) Prior Publication Data
US 2024/0389560 A1    Nov. 28, 2024

Related U.S. Application Data

(60) Provisional application No. 63/260,585, filed on Aug. 26, 2021.

(51) Int. Cl.
*A01K 63/04*    (2006.01)
(52) U.S. Cl.
CPC .................. *A01K 63/042* (2013.01)
(58) Field of Classification Search
CPC .............. A01K 63/04; A01K 63/042
(Continued)

(56) References Cited

U.S. PATENT DOCUMENTS

| 4,663,089 A |   | 5/1987 | Lowry |            |
|-------------|---|--------|-------|------------|
| 5,480,593 A | * | 1/1996 | Marcum | F04F 5/24 |
|             |   |        |       | 261/122.2  |

(Continued)

FOREIGN PATENT DOCUMENTS

| CL | 2016000289 A1 | 8/2016 |
| CN | 101033099 A   | 9/2007 |

(Continued)

OTHER PUBLICATIONS

International Search Report International Application No. PCT/CA2022/051234, mailed Nov. 15, 2022 (4 pp.).

(Continued)

*Primary Examiner* — Brady W Frazier
(74) *Attorney, Agent, or Firm* — Nixon Peabody LLP

(57) ABSTRACT

A gas distribution system for an aquaculture reservoir is provided. The system includes a support structure having a support hub and support brackets connected thereto, with the support hub having an internal chamber with a first port and a second port in fluid communication with one another via the internal chamber. The system also includes a flow control device provided within the internal chamber selectively operable between a closed configuration, where fluid communication between the first and second ports is blocked, and an open configuration, where fluid communication between the first and second ports is allowed. The system further includes a gas distribution hose connected to the second port and supported by the support brackets. The gas distribution hose has a plurality of holes dispersed along a length thereof enabling fluid communication between the gas distribution hose and a surrounding environment.

22 Claims, 14 Drawing Sheets

(58) Field of Classification Search
USPC .......................................................... 119/263
See application file for complete search history.

(56) References Cited

U.S. PATENT DOCUMENTS

| | | | | |
|---|---|---|---|---|
| 5,632,220 | A * | 5/1997 | Vento | B63B 35/26 |
| | | | | 261/29 |
| 5,938,983 | A | 8/1999 | Sheaffer | |
| 6,796,273 | B2 * | 9/2004 | Muscarella | A01K 63/006 |
| | | | | 4/491 |
| 7,441,754 | B2 * | 10/2008 | Trentadue | B01F 23/2331 |
| | | | | 261/87 |
| 9,374,952 | B1 * | 6/2016 | Cross | A01G 31/047 |
| 11,097,229 | B2 * | 8/2021 | Galbreath-O'Leary | |
| | | | | B01F 23/2311 |
| 2009/0127724 | A1 * | 5/2009 | Tsai | B01F 27/271 |
| | | | | 261/93 |
| 2010/0154717 | A1 | 6/2010 | Glomset et al. | |
| 2011/0121472 | A1 * | 5/2011 | Magen | A01K 63/042 |
| | | | | 261/120 |
| 2020/0114319 | A1 * | 4/2020 | Galbreath-O'Leary | |
| | | | | B01F 23/23123 |

FOREIGN PATENT DOCUMENTS

| | | |
|---|---|---|
| CN | 104094888 A | 10/2014 |
| CN | 106561533 A | 4/2017 |
| CN | 106804520 A | 6/2017 |
| CN | 106818606 A | 6/2017 |
| EP | 1015101 B1 | 7/2004 |
| WO | 2021137038 A1 | 8/2021 |

OTHER PUBLICATIONS

Written Opinion International Application No. PCT/CA2022/051234, mailed Nov. 15, 2022 (4 pp.).
Difusor, https://canadianpond.ca/fr/produit/octoair-10-diffuseur-industriel-pour-aeration/ (2015) (10 pp).

* cited by examiner

GAS DISTRIBUTION SYSTEM FOR AQUACULTURE RESERVOIR INCLUDING INTERNAL FLOW CONTROL DEVICE

CROSS-REFERENCE TO RELATED APPLICATIONS

This application is a U.S. National Stage of International Application No. PCT/CA2022/051234, filed on Aug. 15, 2022, which claims the benefit of, and priority to, U.S. Provisional Patent Application No. 63/260,585 filed on Aug. 26, 2021, each of which is hereby incorporated by reference herein in its entirety.

TECHNICAL FIELD

The technical field generally relates to devices and systems for providing gas to a liquid, and more particularly relates to diffusers for aerating aquaculture reservoirs.

BACKGROUND

Aquaculture operations are useful for the farming of fish, shellfish and/or aquatic plants in fresh or salt water. Traditional aquaculture operations require large quantities of livestock (e.g., the farmed aquatic organism(s)) within a predefined environment. In certain conditions, there can be a lack of certain components which can result in a reduction of the quality of the environment of the livestock, which can directly impact the quality of the livestock itself.

Known aquaculture systems can include an oxygen supply system having multiple pipes, joints and connections which require maintenance and upkeep to prevent leaks, damage(s) and/or system failure(s), which can be costly and time consuming.

Indeed, it would be particularly advantageous to provide an apparatus, such as an aquaculture diffuser for performing operations in a more efficient, more precise, more accurate, more reliable, more adjustable, more versatile, more adaptable, more ergonomic and/or more desirable manner, than what is possible with available products and devices.

Thus, it would be particularly useful to be able to provide such an improved apparatus which would be able to overcome or at the very least minimize some of known drawbacks and/or deficiencies associated with conventional methods and/or devices, for example.

SUMMARY

According to an aspect, a gas distribution system for an aquaculture reservoir is provided. The gas distribution system includes, a support structure having a support hub and support brackets connected to the support hub. The support hub has an internal chamber defined therein, and further has a first port and a second port in fluid communication with one another via the internal chamber, with the first port being connectable to a gas source to receive gas therefrom. The gas distribution system also includes a flow control device provided within the internal chamber, the flow control device being selectively operable between a closed configuration, where fluid communication between the first and second ports is blocked, and an open configuration, where fluid communication between the first and second ports is allowed. The gas distribution system further includes a gas distribution hose connected to the second port and supported by the support brackets, the gas distribution hose having a plurality of holes dispersed along a length thereof enabling fluid communication between the gas distribution hose and an environment surrounding the gas distribution hose.

According to a possible embodiment, the support structure further comprises an outer ring, and wherein the support brackets extend between the support hub and the outer ring.

According to a possible embodiment, the support hub is positioned substantially in the center of the outer ring, and the support brackets extend radially between the support hub and the outer ring.

According to a possible embodiment, the support brackets are provided at regular intervals around the support hub.

According to a possible embodiment, the support brackets are independently and removably connected to the support hub.

According to a possible embodiment, the support hub comprises a hub body and a hub cap connectable to one another, the hub body comprising bracket slots shaped and adapted to receive respective support brackets, and wherein connecting the hub cap to the hub body secures the support brackets in respective bracket slots.

According to a possible embodiment, the hub body includes a rabbet edge, and the hub cap includes a circumferential edge shaped and adapted to engage the rabbet edge when connecting the hub cap to the hub body.

According to a possible embodiment, the bracket slots are at least partially defined in the rabbet edge, the support brackets include a proximal end adapted to engage the bracket slot, and wherein the circumferential edge overhangs a portion of the proximal end to secure the proximal end within the bracket slot.

According to a possible embodiment, the bracket slots are generally L-shaped, and wherein the proximal end of the support brackets is complementarily shaped relative to the bracket slots.

According to a possible embodiment, the support hub comprises an auxiliary port communicating with the internal chamber and provided with a removable seal, and wherein the removable seal is selectively removable to allow access to the flow control device within the internal chamber.

According to a possible embodiment, the flow control device is a check valve comprising a ball.

According to a possible embodiment, the flow control device is operable between the closed configuration and the open configuration via fluid flow.

According to a possible embodiment, the flow control device further comprises a biasing element configured to bias the ball in sealing engagement with internal surfaces of the internal chamber.

According to a possible embodiment, the biasing element is a spring.

According to a possible embodiment, at least one of the hub body and the hub cap are made of plastic, and wherein at least one of the outer ring and the support brackets are made of metal.

According to a possible embodiment, the gas distribution system further includes a hose adapter coupled between the second port and the gas distribution hose, the hose adapter comprising an adapter body provided with an inlet connectable to the second port and an outlet connectable to the gas distribution hose to establish fluid communication between the support hub and the gas distribution hose.

According to a possible embodiment, the inlet is vertically lower than the outlet on the adapter body.

According to a possible embodiment, the gas distribution hose extends in a spiralling configuration around the support hub.

According to a possible embodiment, the gas distribution hose is arranged in a single plane.

According to a possible embodiment, the support brackets are arranged in a common plane.

According to a possible embodiment, the single plane is substantially parallel to the common plane.

According to another aspect, a fluid distribution system for aerating a reservoir is provided. The fluid distribution system includes a support structure having a support hub and support brackets connected to the support hub, the support hub having an internal passage connectable to a fluid source to receive fluid therefrom. The fluid distribution system also includes a flow control device operatively coupled to the support hub and operable between a closed configuration and an open configuration to control fluid communication through the internal passage. The fluid distribution system further has a fluid distribution hose connected to the support hub and supported by the support brackets such that the fluid distribution hose extends around the support hub in a single plane, the fluid distribution hose being adapted to receive fluid from the fluid source via the internal passage of the support hub when the flow control device is operated in the open configuration for distribution of the fluid in an environment surrounding the distribution system.

BRIEF DESCRIPTION OF THE DRAWINGS

FIG. 1A is an enlarged view of a portion of the aquaculture diffuser shown in FIG. 1, showing holes defined in a gas distribution hose, according to an embodiment.

DETAILED DESCRIPTION

As will be explained below in relation to various embodiments, the present disclosure describes apparatuses, systems and methods for various operations, including the aeration of water reservoirs, such as water reservoirs used in relation to aquaculture operations.

The present disclosure relates to a diffuser and corresponding parts for aerating a reservoir, such as a reservoir full of water for the culture of plants and/or animals, for example. In other words, the diffuser is configured to provide fluids, such as gas (e.g., air) to a tank of water used as part of aquaculture operations. It should be understood that, as used herein, the expression "aquaculture" can also be referred to as "aquafarming" and can refer to the farming of fish, shellfish and/or aquatic plants in fresh or salt water, such that an "aquaculture reservoir" can refer to a container or tank of water used to contain the farmed product. The diffuser includes a support structure and a distribution hose, such as a gas distribution hose, adapted to be positioned within the reservoir and submerged in the water to supply air to the water (i.e., to aerate the water).

The support structure can include a support hub coupled between the distribution hose and a fluid supply, such as a gas tank. The support hub can be shaped and adapted to contain a flow control device within an internal chamber thereof. The flow control device is configured to control the flow of fluid from the fluid supply to the distribution hose. In some implementation, the flow control device is operable between a closed configuration, where fluid flow through the support hub (e.g., through the internal chamber) is blocked, and an open configuration, where fluid flow through the support hub and into the distribution hose is allowed. In some embodiments, and as will be further described below, the diffuser can include a hose adapter configured to be coupled between the support hub and the distribution hose. The hose adapter is shaped and adapted to reduce the number of parts required to connect the distribution hose to the support hub and can be further adapted to prevent potential damages to the distribution hose caused by curves and bends in the hose.

Figure 1:
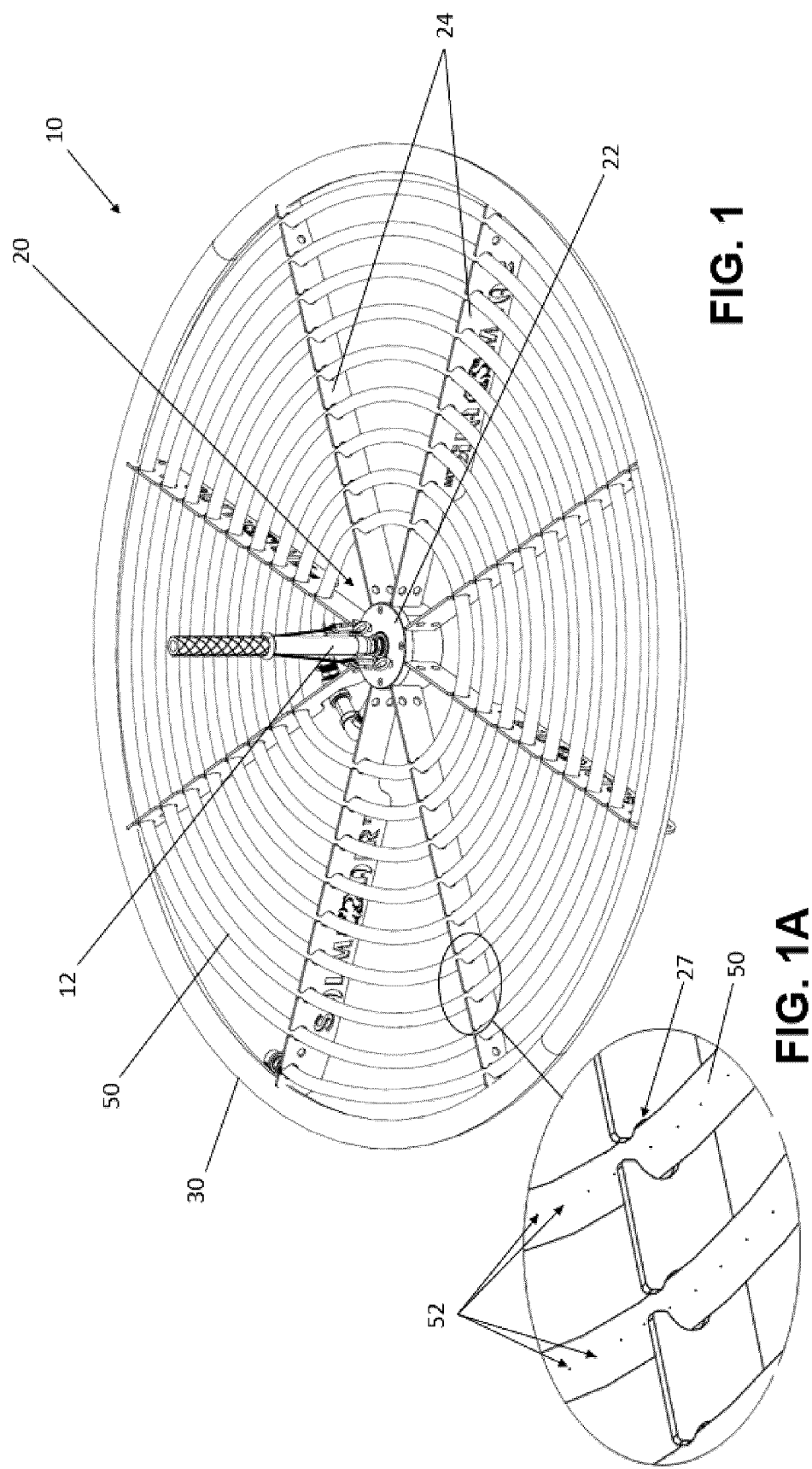
FIG. 1 is top perspective view of an aquaculture diffuser according to an embodiment.

With reference to FIG. 1, a possible embodiment of a distribution system 10, or gas distribution system (e.g., a "diffuser" or "aquaculture diffuser"), adapted to be used as of aquaculture operations is shown. The gas distribution system 10 can include a support structure 20 for supporting a flexible hose, such as a fluid or gas distribution hose 50. In some embodiments, the support structure 20 can be fluidly coupled between a supply system, such as a gas source (not shown), and the gas distribution hose 50 such that fluid can flow from the supply system to the gas distribution hose. As will be described further below, the support structure 20 includes a support hub 22 coupled to the supply system via a supply conduit 12, and further includes support brackets 24 connected to the support hub 22 for supporting the gas distribution hose 50 around the support hub 22.

Figure 13:
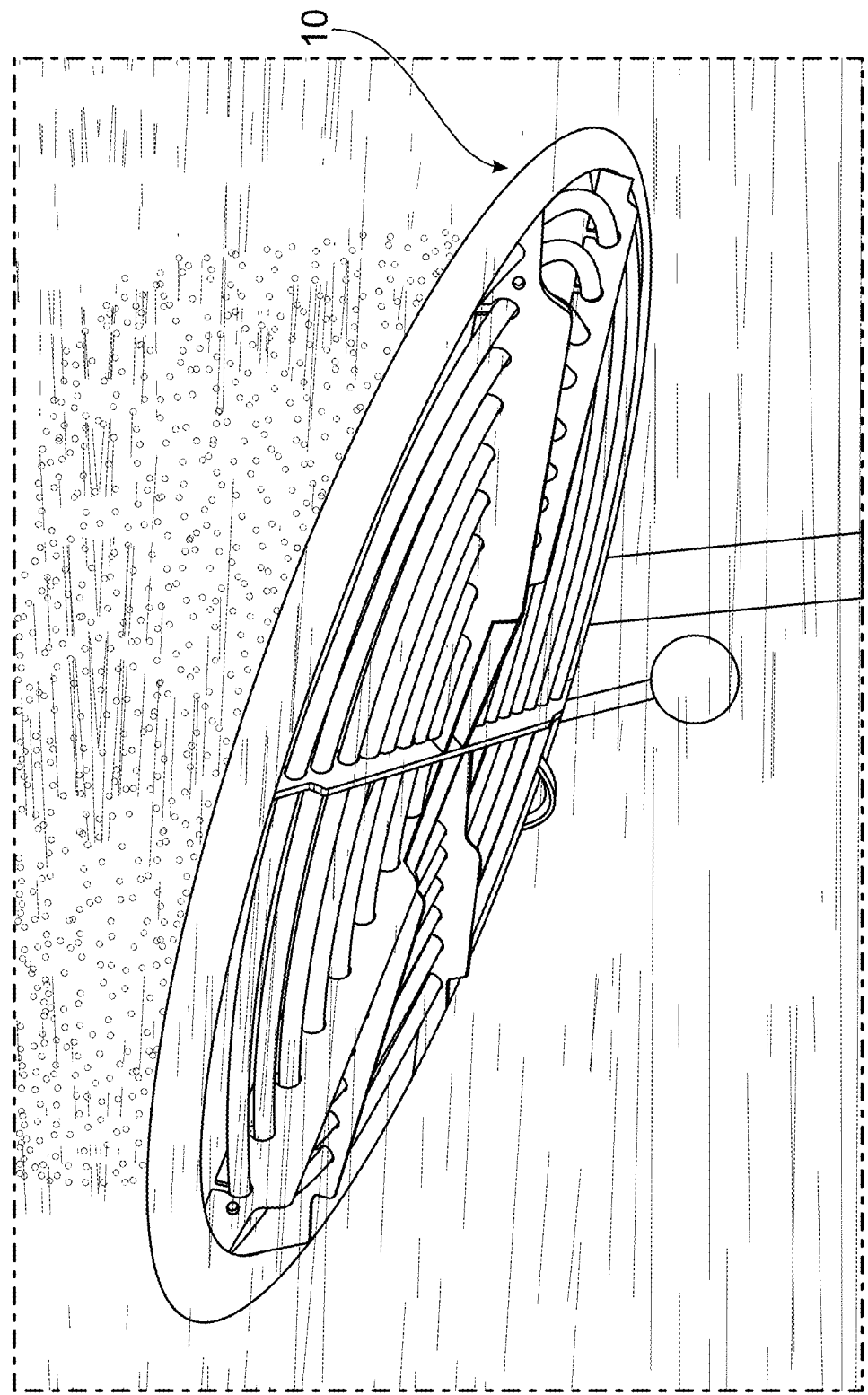
FIG. 13 is a representation of an aquaculture diffuser submerged in water and in operation to provide a gas to the water, according to an embodiment.
Figure 14:
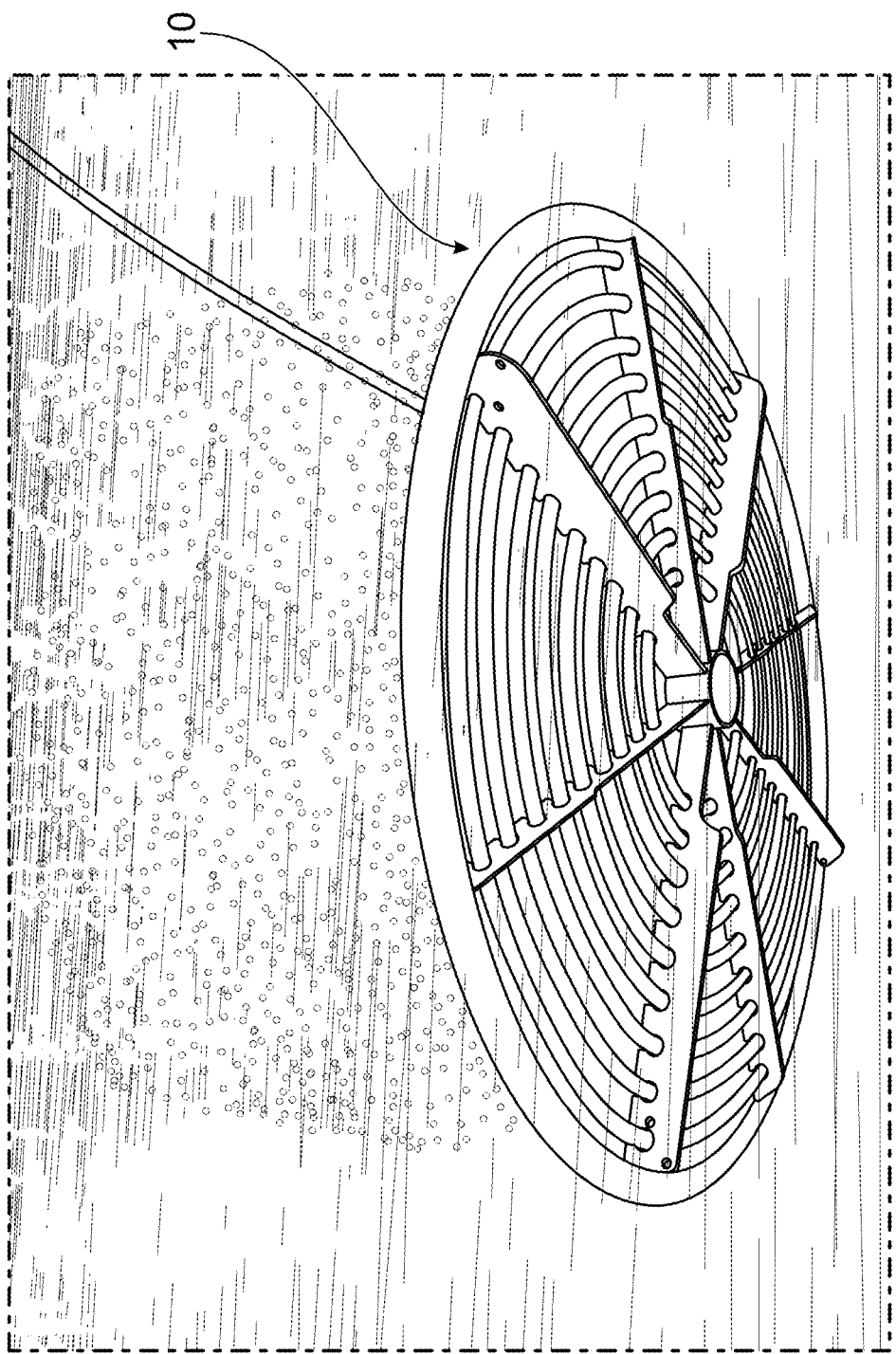
FIG. 14 is another representation of the aquaculture diffuser submerged in water and in operation to provide a gas to the water, according to an embodiment.

The gas distribution hose can be coupled to the support hub via a hose adapter adapted to route fluid from the support hub to the hose. As seen in FIG. 1A, the gas distribution hose 50 can be provided with a plurality of holes 52 dispersed along a length thereof for enabling fluid communication between the gas distribution hose 50 and the surrounding environment of the gas distribution system 10. For aquaculture operations, the gas distribution system 10 can be lowered into an aquaculture reservoir (seen in FIGS. 13 and 14) and submerged in water such that fluid provided to the gas distribution hose 50 can flow through the holes 52 and into the water of the reservoir for aeration purposes. As seen in FIGS. 13 and 14, the gas distribution system 10 can be operated to create a column of bubbles as fluid is injected into the water for aeration thereof. In some embodiments, the gas distribution system 10 can be lowered into the reservoir via any suitable system, such as a support system connected to the support hub and/or the supply conduit 12, for example.

In the present embodiment, the support structure 20 further includes an outer ring extending around the support hub 22. As seen in FIG. 1, the support brackets 24 extend between the support hub 22 and the outer ring 30 to support the gas distribution hose 50 in the area defined between the support hub 22 and the outer ring 30. The support hub 22 can define a central point of the gas distribution system 10, with the outer ring 30 defining a perimeter (e.g., a circle) around the support hub 22. The support brackets 24 can thus extend radially outwardly from the support hub 22 toward the outer ring 30 around the support hub 22. In some embodiments, the support brackets 24 are provided at regular intervals around the support hub 22, although it is appreciated that other configurations are possible. Moreover, it is noted that the support structure 20 can include any number of support brackets 24 for supporting the hose 50, such as two, three, four, six, eight, ten, twenty support brackets 24, for example.

Figure 10:
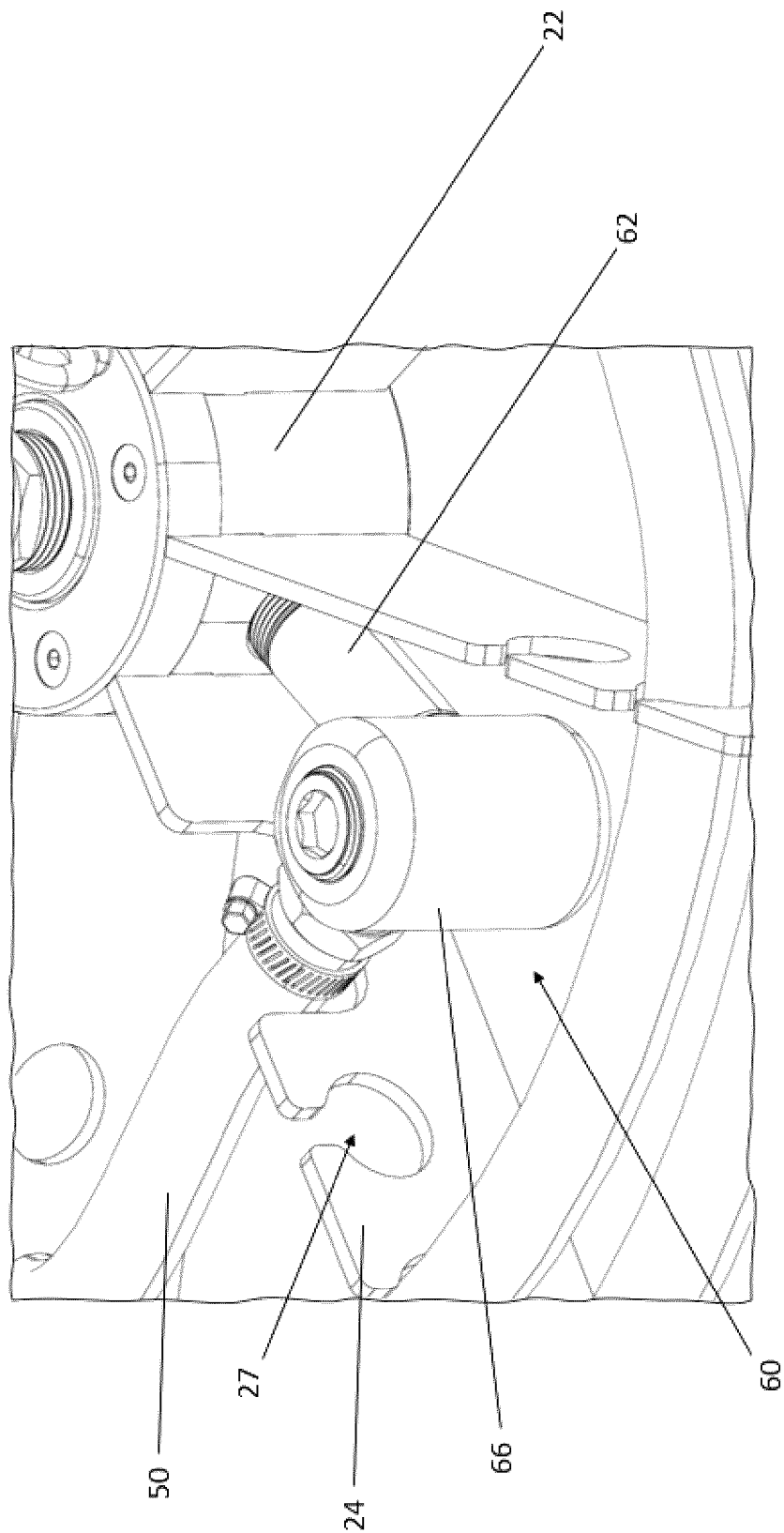
FIG. 10 is an enlarged view of the aquaculture diffuser shown in FIG. 10, showing the hose adapter coupled between the gas distribution hose and the support hub, according to an embodiment.
Figure 11:
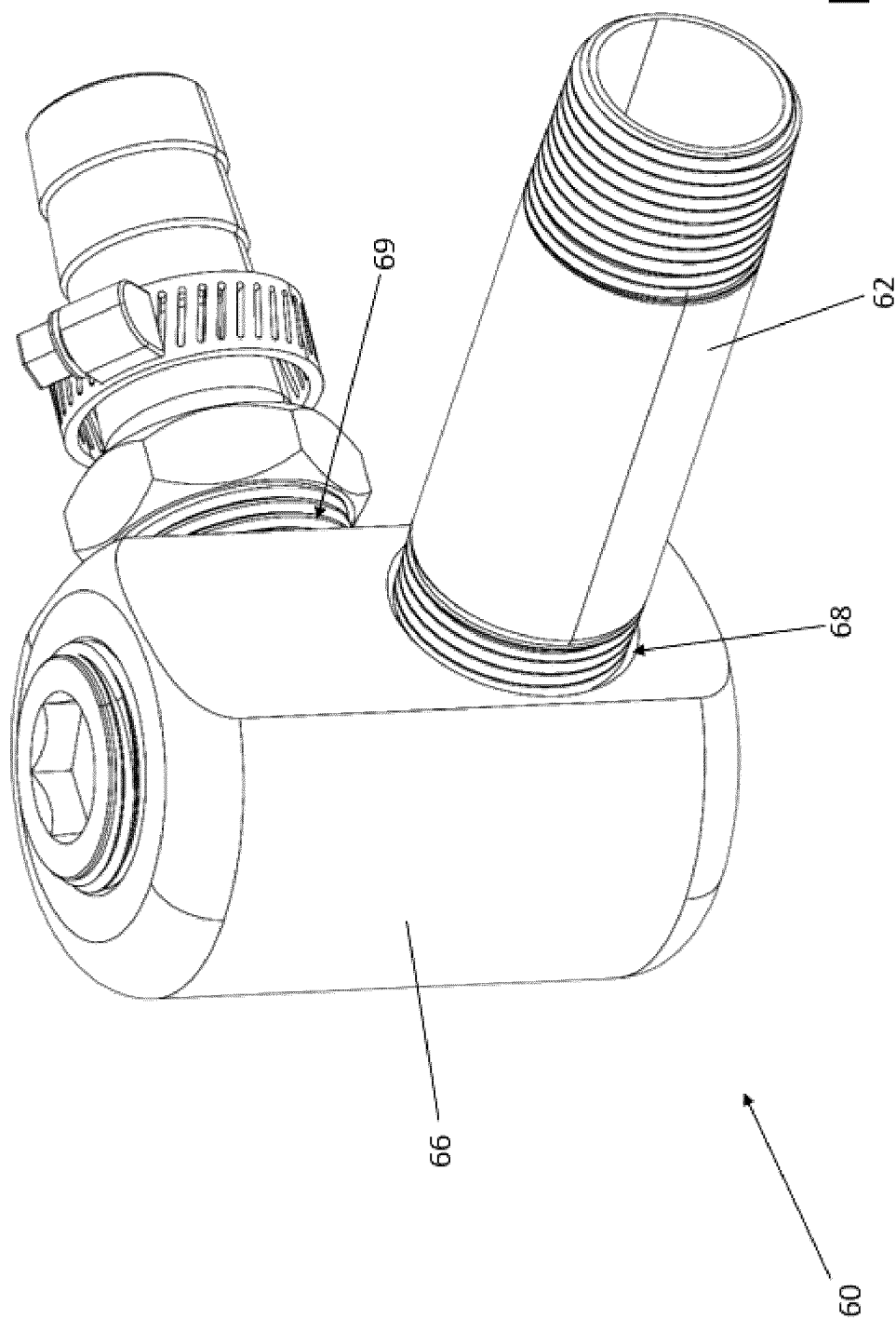
FIG. 11 is perspective view of the hose adapter shown in FIG. 11, showing an adapter body provided with an inlet and an outlet, according to an embodiment.

Still referring to FIGS. 1 and 1A, in this embodiment, the support brackets 24 are arranged around the support hub 22 and are generally provided in a common plane. In other words, the support brackets 24 can be generally parallel and/or coplanar relative to one another. As mentioned above, the support brackets 24 are adapted to support the gas distribution hose 50. In this embodiment, the support brackets 24 are provided with recesses 27 (seen in FIGS. 1A and 10) provided along a length of the support bracket, and in which the gas distribution hose 50 can be positioned to be supported around the support hub 22. The recesses 27 can open on a top edge of the support bracket 24 to allow the gas distribution hose 50 to be inserted into the recess 27 from above. The opening of the recess can be smaller to prevent accidental or undesired removal of the gas distribution hose 50 from the recess 27 during operation (e.g., during injection of air in the water reservoir). However, it is appreciated that other configurations are possible for supporting the gas distribution hose 50 on the support brackets 24 and/or around the support hub 22.

Figure 8:
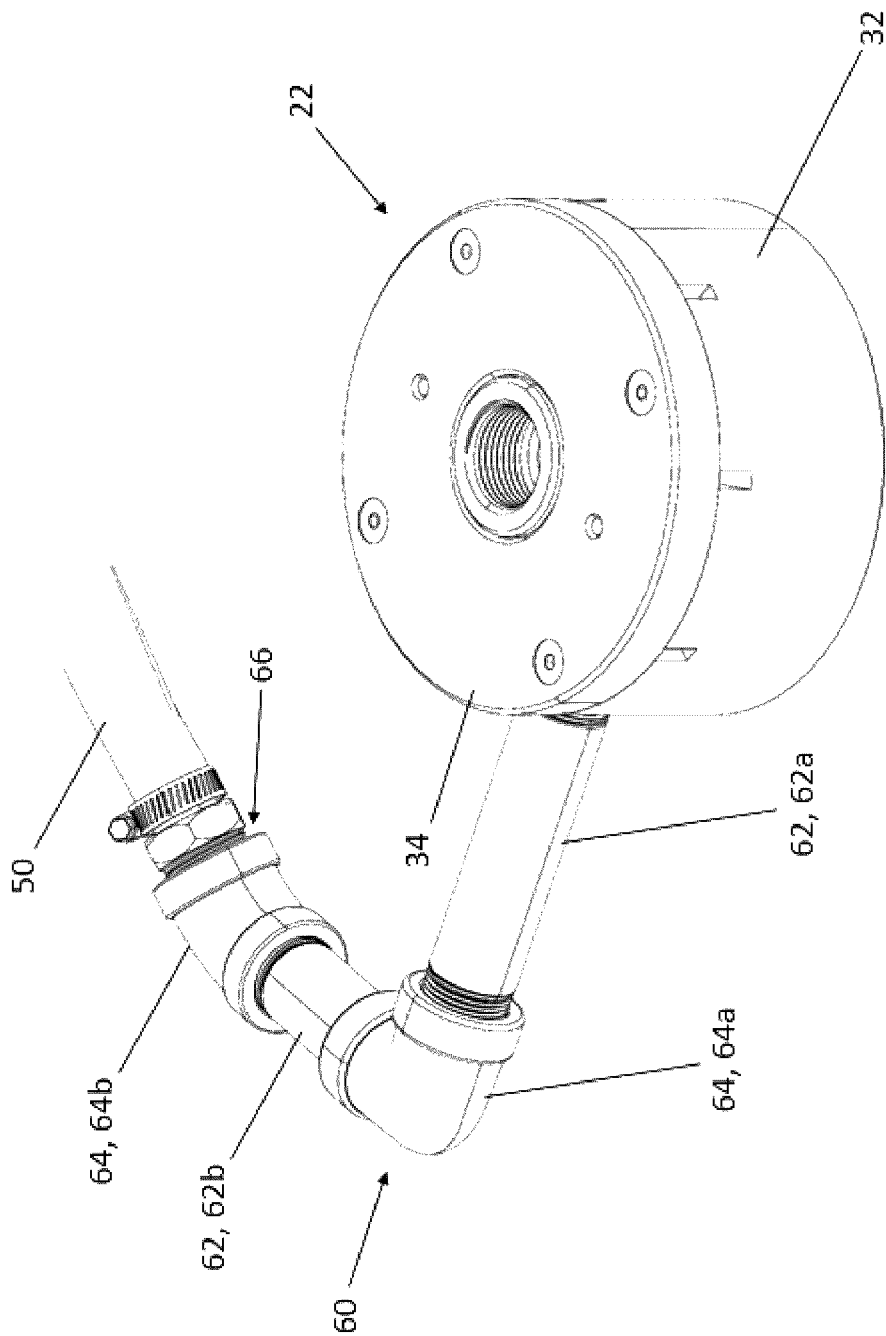
FIG. 8 is a perspective view of a gas distribution hose connected to the support hub via a hose adapter, according to an embodiment.

In this embodiment, the gas distribution hose is coupled to the support hub 22 at a first end thereof, and extends outwardly (e.g., toward the outer ring 30) in a spiralling configuration around the support hub 22. The gas distribution hose 50 is supported by the coplanar support brackets 24 such that the gas distribution hose generally extends in a single plane. It should thus be noted that the common plane of the support brackets 24 and the single plane of the gas distribution hose 50 can be the same plane or at least generally parallel to one another, although other configurations are possible. In some embodiments, the first end of the gas distribution hose 50, which is coupled to the support hub 22, is lower than the rest of the gas distribution hose 50 extending in a spiral around the support hub 22, as seen in FIGS. 1 and 8, for example. As such, it is noted that a portion of the gas distribution hose 50 (e.g., the first end of the gas distribution hose 50) is not provided in the single plane. However, in other embodiments, and as will be described further below, the gas distribution hose 50 is arranged in a manner to completely extend in the single plane, thereby reducing bends and turns along the gas distribution hose 50.

Figure 2:
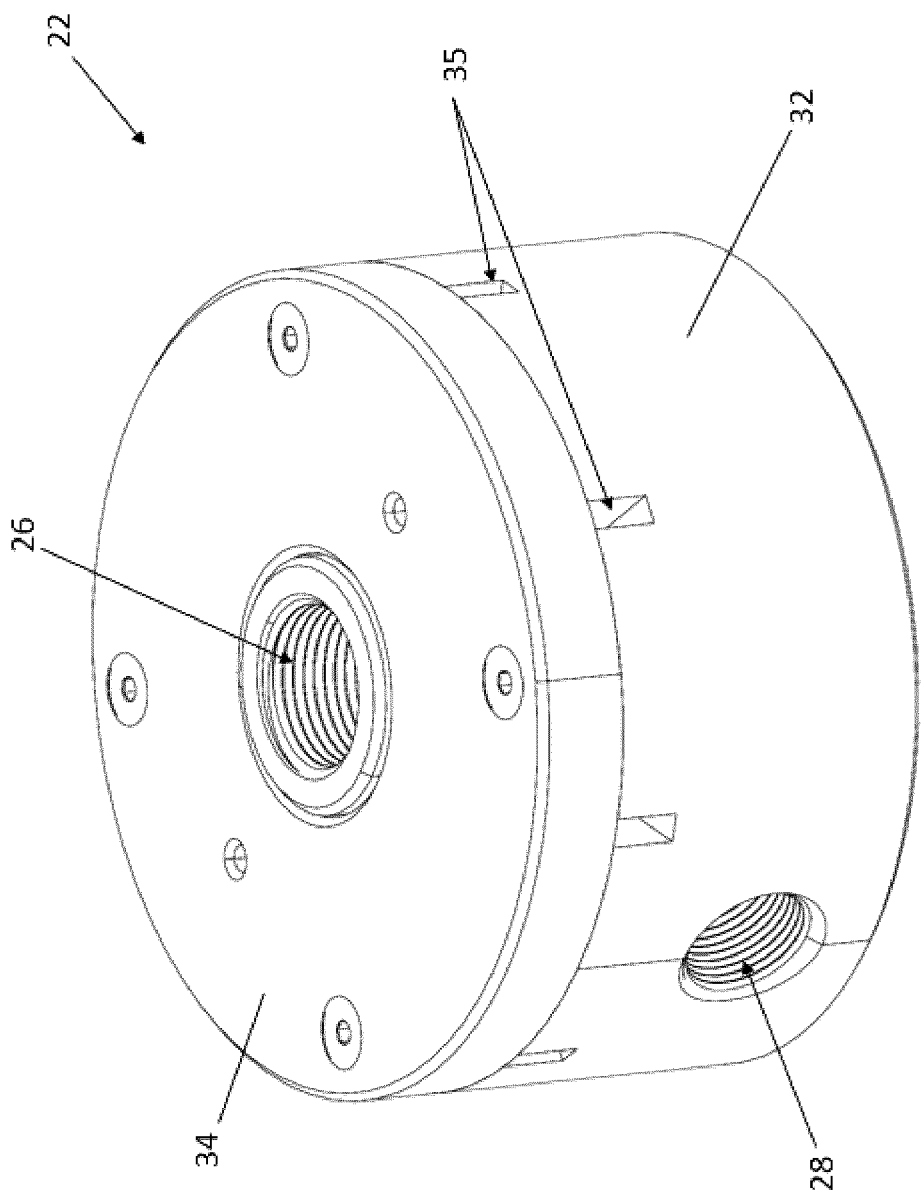
FIG. 2 is a perspective view of a support hub according to an embodiment.
Figure 3:
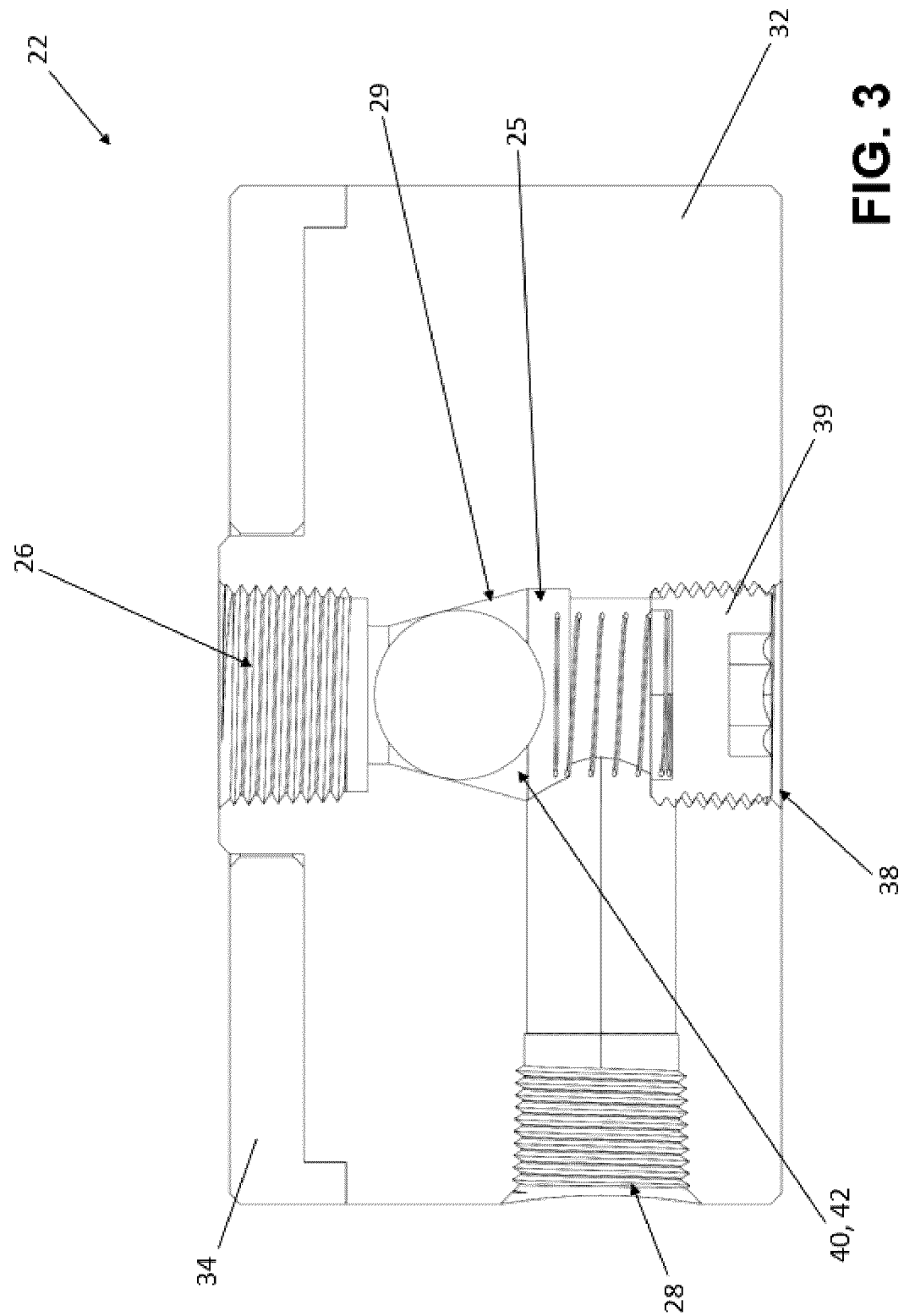
FIG. 3 is a sectional view of the support hub shown in FIG. 2, showing a flow control device installed within an internal chamber of the support hub, according to an embodiment.
Figure 9:
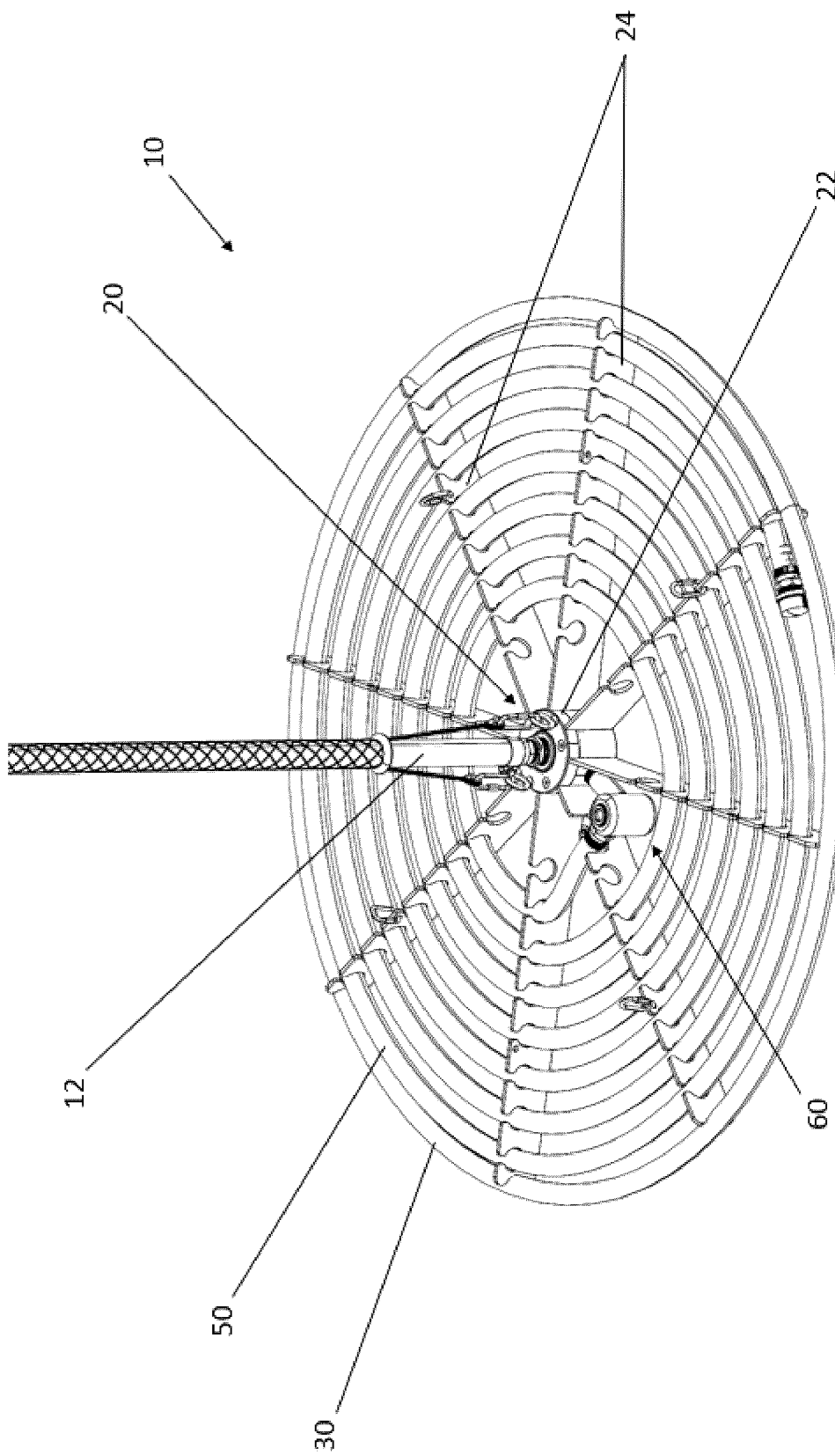
FIG. 9 is a perspective view of another embodiment of the aquaculture diffuser, showing another implementation of the hose adapter.

Now referring to FIGS. 2 and 3, in addition to FIGS. 1 and 1A, the support hub 22 can include internal channels and/or an internal chamber 25 through which fluid can flow from the supply conduit 12 to the gas distribution hose 50. More particularly, the support hub 22 has a first port 26 communicating with the internal chamber 25, and to which the supply conduit 12 can be connected (as seen in FIGS. 1 and 9). In addition, the support hub 22 can have a second port 28 communicating with the internal chamber 25, and to which the gas distribution hose can be connected. Therefore, it is noted that the first and second ports 26, 28 are in fluid communication with one another via the internal chamber 25, and that fluid provided from the supply conduit can flow into the internal chamber 25 through the first port 26, and then into the gas distribution hose 50 through the second port 28.

As seen in FIG. 3, the gas distribution system includes a flow control device 40 configured to control fluid flow from the gas source to the gas distribution hose 50. More specifically, the flow control device 40 can be provided within the internal chamber 25 of the support hub 22 and is operable between a closed configuration, where fluid communication between the first and second ports 26, 28 is blocked, and an open configuration, where fluid communication between the first and second ports is allowed. The flow control device 40 is shown in the closed configuration in FIG. 3 and is adapted to prevent fluid from flowing into the internal chamber 25 from the first port 26, and is thus adapted to prevent fluid from flowing to the second port 28 and into the gas distribution hose. In this embodiment, the flow control device 40 includes a check valve 42 configured to selectively prevent fluid flow in a desired direction and allow fluid flow in another. For example, the check valve 42 can selectively control fluid flow between the first port 26 and the second port 28 (i.e., between the gas source and the gas distribution hose).

Figure 4:
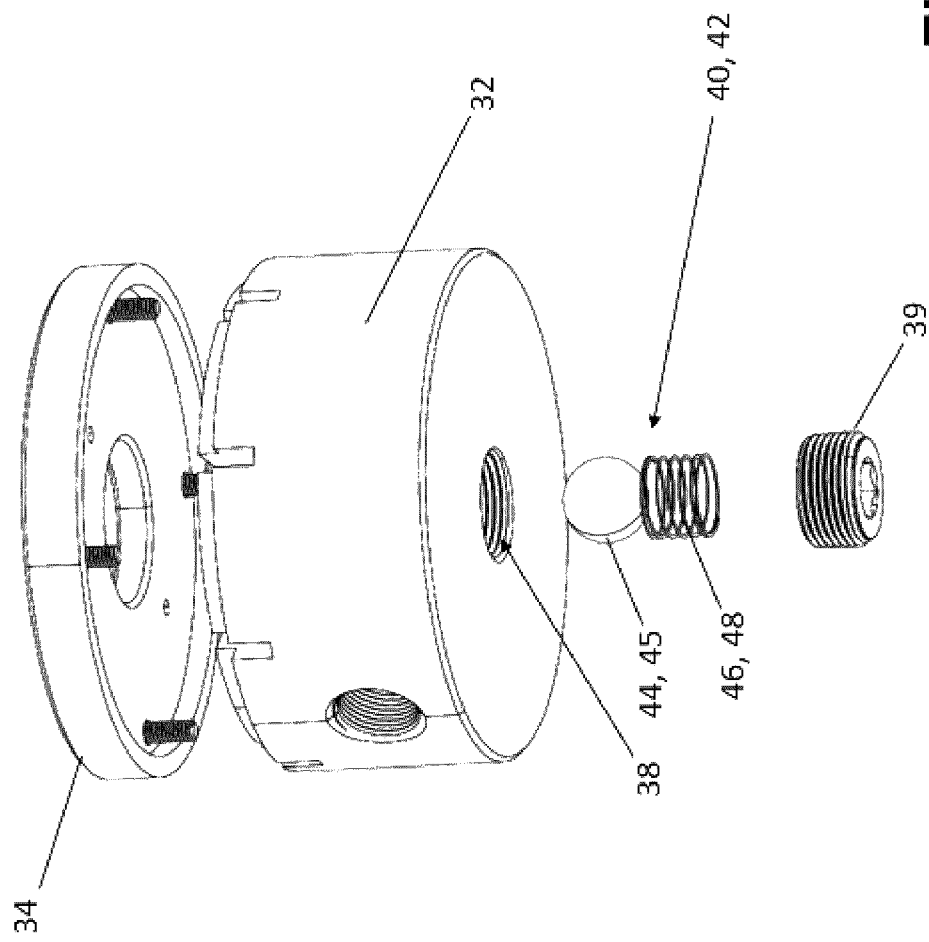
FIG. 4 is an exploded bottom perspective view of the support hub shown in FIG. 2, showing an auxiliary port of the hub body defined through a bottom surface thereof, according to an embodiment.
Figure 5:
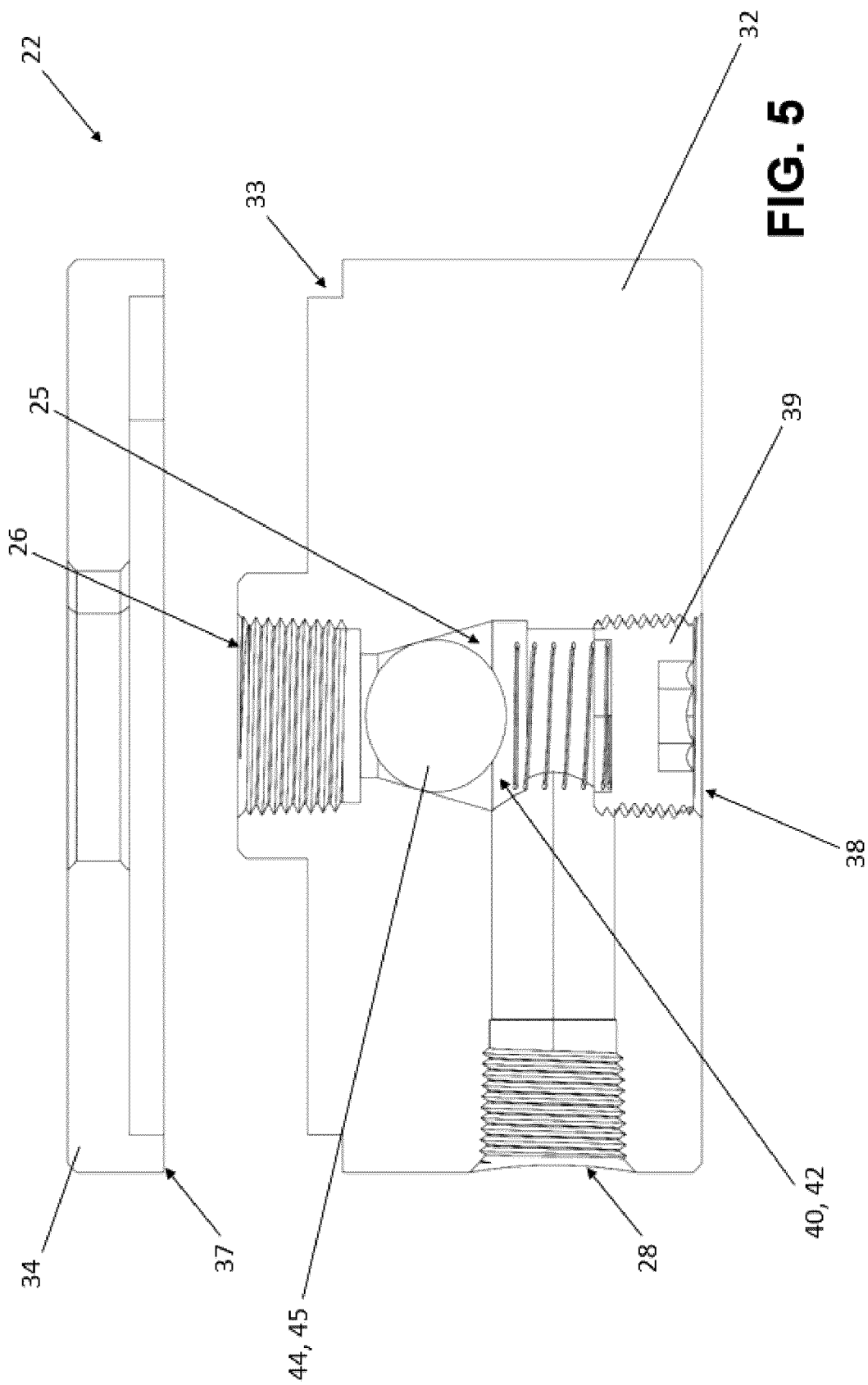
FIG. 5 is a partially exploded sectional view of the support hub shown in FIG. 2, showing a hub cap disconnected from a hub body, according to an embodiment.

With reference to FIGS. 4 and 5, in addition to FIGS. 2 and 3, in some embodiments, the check valve 42 includes an occluding member 44 and a biasing element 46 coupled together. The occluding member 44 can be moved between a closed position and an open position, with the biasing element 46 being configured to bias the occluding member 44 in the closed position. It is noted that positioning the occluding member 44 in the closed position corresponds to operating the check valve 42 in the closed configuration, and that positioning the occluding member 44 in the open position corresponds to operating the check valve 42 in the open configuration. In this embodiment, the occluding member 44 includes a ball 45 shaped and adapted to sealingly engage one or more surfaces of the internal chamber 25 to prevent fluid flow therethrough.

As seen in FIG. 3, the internal chamber 25 can include a tapered section 29 having internal surfaces against which the ball 45 can abut to create a seal along the internal chamber 25. The biasing element 46 can include a spring 48 configured to bias the ball 45 against the surfaces of the tapered section 29. It is appreciated that other components can be used as the biasing element 46, such as a flap of resilient material, or simply filling the internal chamber 25 with water to maintain the ball in sealing engagement with the inner surfaces via the Archimedes principle, for example.

It should be understood that initiating fluid flow, for example, from the gas source, creates a hydraulic pressure against the ball 45, and that once the pressure is greater than the force of the spring 48, the spring compresses and the ball 45 retracts. Fluid communication between the first and second ports 26, 28 through the internal chamber is thus established and fluid can flow into the gas distribution hose 50. Stopping the supply of fluid thus reverts the check valve 42 in the closed configuration as the spring 48 pushes the ball 45 back in sealing engagement with the internal surfaces of the internal chamber. Although the flow control device 40 of the present embodiment includes a single check valve, it is appreciated that other devices, systems, components, or combination(s) thereof are possible for controlling fluid flow from a source of fluid to a separate component, such as the gas distribution hose.

With continued reference to FIGS. 3 to 5, the support hub 22 can include an auxiliary port 38 communicating with the internal chamber 25. In this embodiment, the auxiliary port 38 is defined through a bottom surface of the support hub 22 to provide access to the flow control device 40 provided inside the internal chamber 25. For example, the components of the flow control device 40 (e.g., the ball 45, the spring 48, etc.) can be removed, repaired, or otherwise replaced via the auxiliary port 38. In addition, the auxiliary port 38 can be provided with a removable plug or seal 39 configured to sealingly engage the auxiliary port 38 to prevent fluid to flow out of the internal chamber through the auxiliary port 38 during operation of the gas distribution system. In this embodiment, the removable seal 39 can be threaded into the auxiliary port 38 to create a seal therein, although it is appreciated that other configurations are possible. As such, the removable seal can be selectively removed from the auxiliary port 38 to provide access to the check valve 42 within the internal chamber 25. In some embodiments, the inner surface of the removable seal 39 can be shaped and adapted to receive a portion of the spring 48 for maintaining the spring in position within the internal chamber 25.

Figure 6:
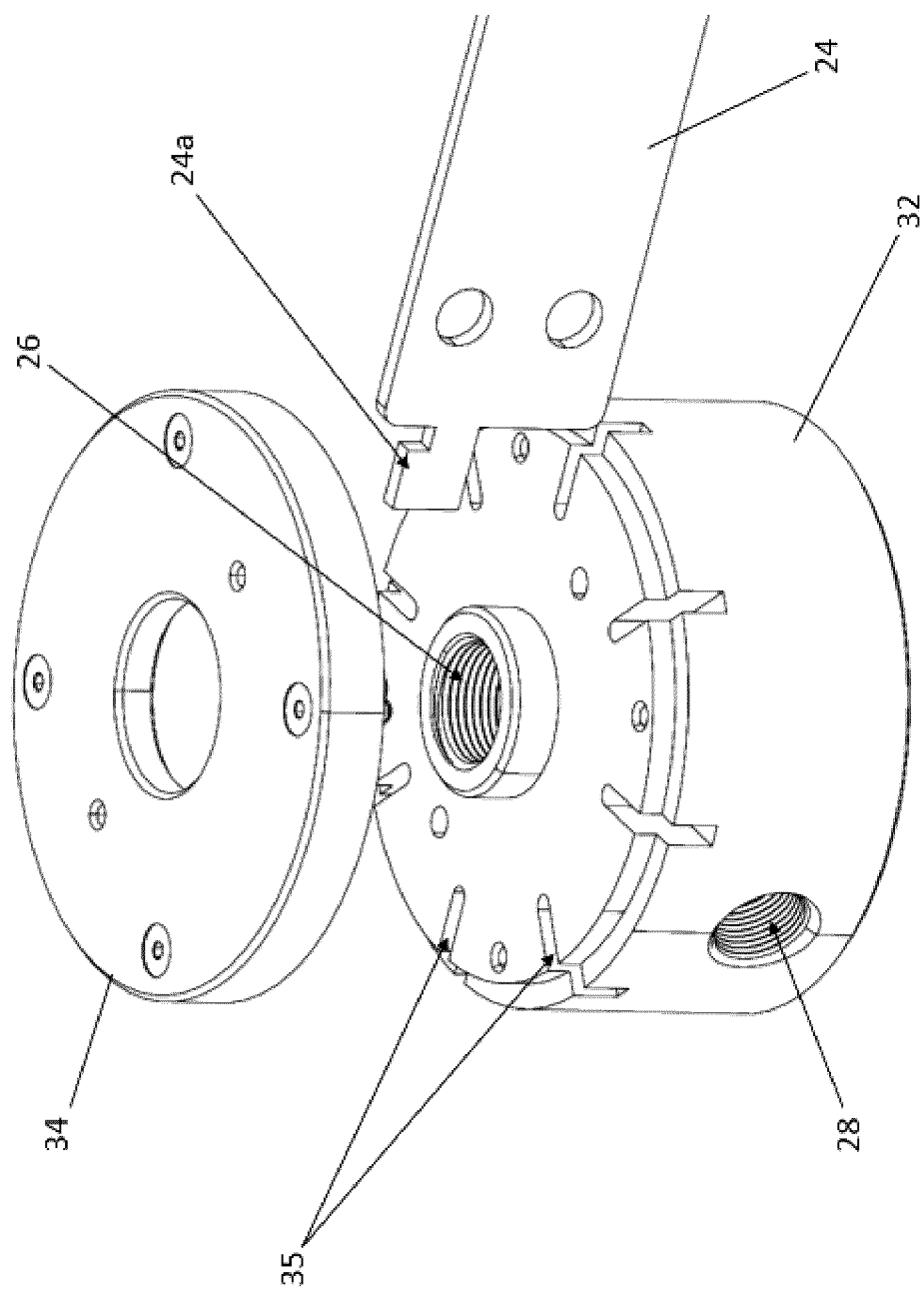
FIG. 6 is an exploded perspective view of the support hub shown in FIG. 2, showing a bracket adapted to be inserted in one of a plurality of bracket slots, according to an embodiment.
Figure 7:
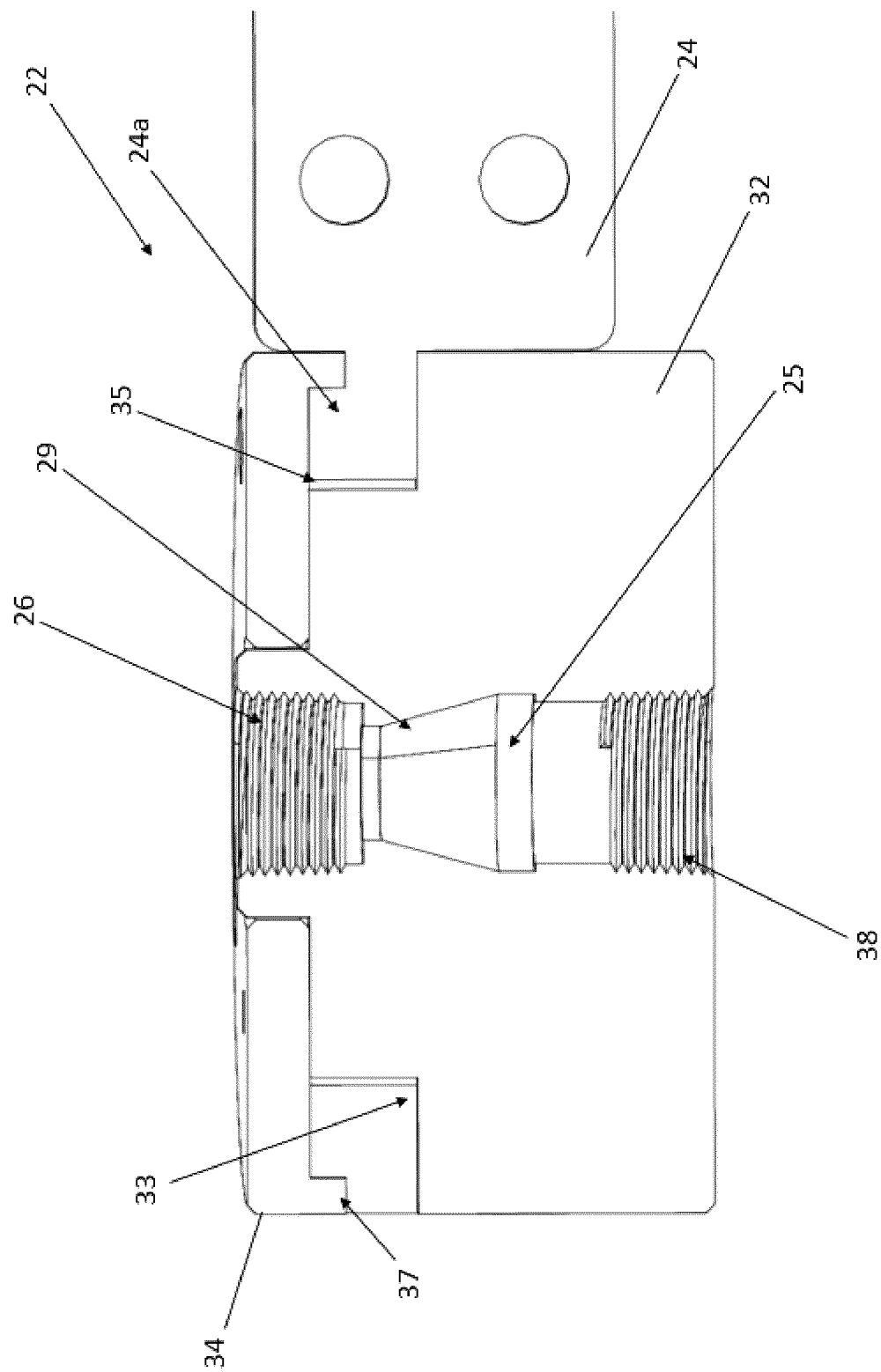
FIG. 7 is a sectional view of the support hub shown in FIG. 2, showing a bracket coupled to the support hub between the hub body and the hub cap, according to an embodiment.

Now referring to FIGS. 5 to 7, the support hub 22 can include two or more components connected to one another. For example, in this embodiment, the support hub 22 includes a hub body 32 and a hub cap 34, with the hub body 32 being the part of the support hub 22 in which is defined the first and second ports 26, 28 and the internal chamber 25. The hub body 32 can further include a plurality of bracket slots 35 shaped and adapted to receive a portion of a corresponding support bracket 24, with the hub cap 34 securing the support brackets within their bracket slots 35 when connected to the hub body 32. It is thus noted that the support brackets 24 can be independently and removably connected to the support hub 22. As will be described further below, the bracket slots 35 can be defined along a top edge 33 of the hub body 32, and the hub cap 34 can include a circumferential edge 37 adapted to overhang and engage a portion of the top edge 33 when connected to the hub body 32. In this embodiment, the hub cap 34 can be removably connected to the hub body 32 using mechanical fasteners (e.g., screws), although other connection means can be used.

In some embodiments, the top edge of the hub body 32 can include a rabbet or groove, thereby defining a rabbeted edge 33, and the circumferential edge 37 of the hub cap 34 can be complementarily shaped relative to the rabbet to engage the rabbet when connected to the hub body 32. As seen in FIGS. 6 and 7, the bracket slots 35 can be at least partially defined in the hub body 32, and more specifically in the rabbeted edge 33. In this embodiment, the support brackets 24 include a proximal end 24a shaped and adapted to be positioned within a corresponding one of the bracket slots 35. The bracket slots 35 can be L-shaped, and the proximal ends 24a can be generally hook-shaped to at least partially conform to the bracket slot 35 and rabbeted edge 33 of the hub body 32. As seen in FIG. 7, the proximal end 24a can be mostly positioned within the bracket slot 35, with the circumferential edge 37 of the hub cap 34 extending over the rabbeted edge 33 and over the proximal end 24a. As such, it is noted that connecting the hub cap 34 to the hub body 32 secures the proximal end 24a within its bracket slot 35, thereby securing the support bracket 24 to the support hub 22.

Therefore, it should be noted that disconnecting the hub cap 34 from the hub body 32 enables the removal of the support brackets 24 from their bracket slots 35 for maintenance or replacement, for example. More specifically, the support brackets 24 can be individually removed from the hub body 32 such that a single support bracket 24 can be replaced, for example, if damaged or otherwise defective. In some embodiments, the hub body 32 and hub cap 34 can be made of plastic, such as PVC, and the outer ring 30 and support brackets 24 can be made of a metallic material, such as aluminium, although other materials and/or combination thereof can be used.

With reference to FIG. 8, the gas distribution system can include a hose adapter 60 coupled between the support hub 22 and the gas distribution hose 50 to establish fluid communication between the second port and the hose. The hose adapter 60 can include one or more conduits 62 extending from the second port in a desired configuration to reduce bends and turns in the gas distribution hose 50. For example, if the gas distribution hose 50 was connected directly to the second port, it would require a relatively large area to begin spiralling around the support hub 22 to prevent damages to the hose, such as by bending the hose further than its bend radius, for instance.

In the illustrated embodiment, the hose adapter 60 includes a first conduit 62a, a first shoulder 64a, a second conduit 62b and a second shoulder 64b coupled to another and extending between the hub body 32 (e.g., the second port) and the first end of the gas distribution hose 50. The conduits 62 and shoulders 64 are configured to orient the gas distribution hose 50 in a manner to reduce the bends and turns of the hose and facilitate positioning the hose in the spiral configuration around the support hub 22. In this embodiment, the second shoulder 64b is positioned vertically lower than the single plane in which the majority of the gas distribution hose 50 extends. In other words, the first end of the gas distribution hose 50 curves slightly (e.g., without exceeding the bend radius) to reach a first recess defined on one of the support brackets.

Now referring to FIGS. 9 to 12, another embodiment of the gas distribution system 10 is shown. More specifically, an alternate embodiment of the hose adapter 60 is provided which is adapted to reduce the bends and turns of the gas distribution hose 50 and is further adapted to enable positioning the gas distribution hose 50 fully in a single plane. In some embodiments, the hose adapter 60 includes an adapter body 66 having a hollow interior 67 provided with an inlet 68 and an outlet 69. The adapter body 66 can be coupled to the support hub 22 via a conduit 62 connected to and extending between the second port 28 of the support hub and the inlet 68 of the adapter body, thereby establishing fluid communication between the internal chamber 25 and the hollow interior 67. Fluid can thus flow into the hollow interior via the inlet 68, and out of the hollow interior via the outlet 69 which is coupled to the gas distribution hose 50. The gas distribution hose 50 can be connected directly to the adapter body 66 (e.g., to the outlet 69) or coupled thereto via a conduit extending from the outlet.

Figure 12:
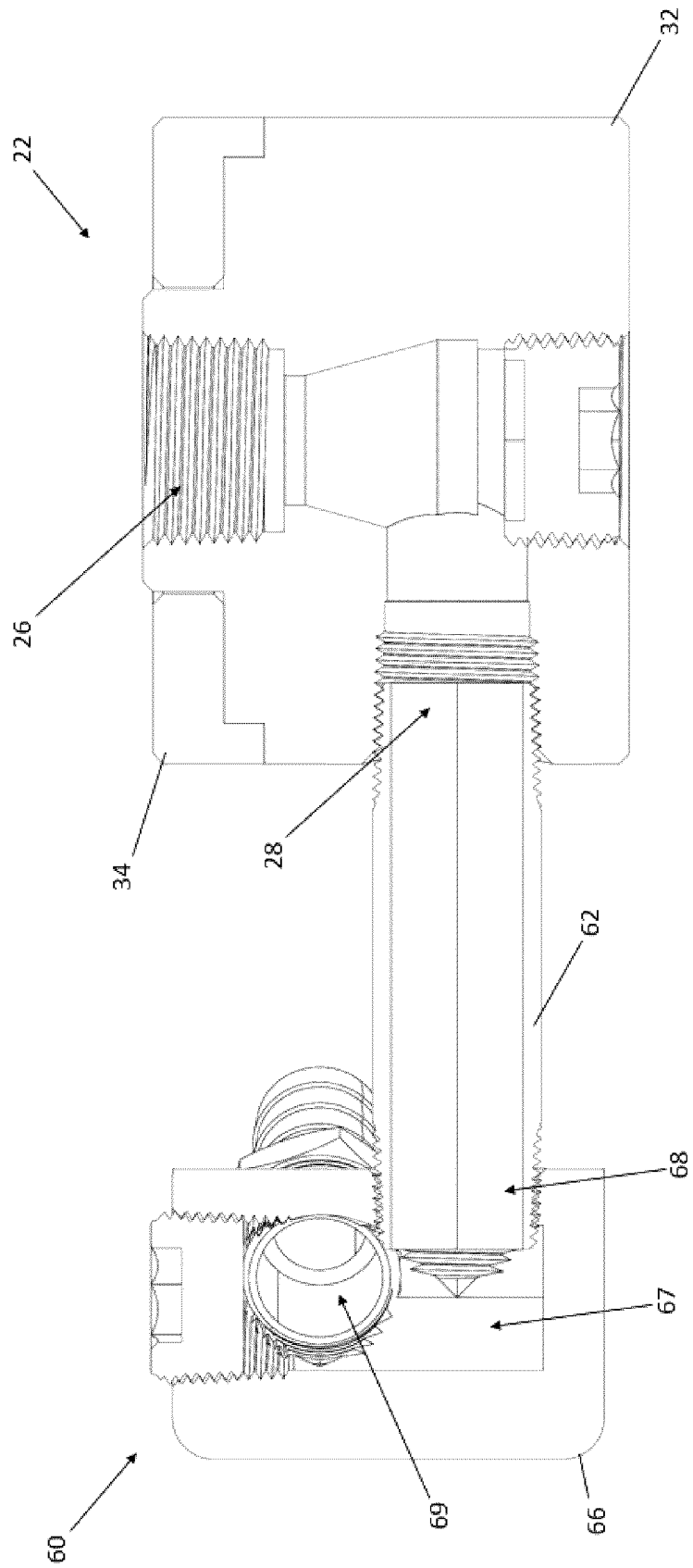
FIG. 12 is a sectional view of the support hub and the hose adapter, showing the adapter body inlet being vertically lower than the adapter body outlet, according to an embodiment.

In some embodiments, the inlet 68 and outlet 69 of the adapter body 66 can be offset relative to one another. More particularly, the inlet 68 and outlet 69 can be provided at different radial positions around the generally cylindrical adapter body 66. Alternatively, or additionally, the inlet and outlet can be axially offset relative to one another along the longitudinal axis of the adapter body 66. In other words, and as seen in FIG. 12, the inlet 68 can be defined in the adapter body 66 at a first position along the longitudinal axis thereof (e.g., along a height of the adapter body), while the outlet can be defined in the adapter body at a second, different, position along the longitudinal axis. In this embodiment, the outlet 69 is vertically higher than the inlet 68 and positioned in the same plane as the gas distribution hose 50. As such that the gas distribution hose 50 can be coupled to the outlet 69 and completely arranged in the single plane as it spirals around the support hub 22.

It should be appreciated from the present disclosure that the various implementations of the gas distribution system therefore provide several advantages over conventional devices and/or apparatus in that: a) it reduces the number of connections which are submerged in water and thereby at risk of water infiltration by integrating and isolating the flow control device within the structure used to uphold the gas distribution hose (e.g., within the support hub); b) it reduces the number of connections at the outlet of the support hub by providing an adapter body having inlets and outlets positioned in predetermined locations; c) it enables individual maintenance (repair and/or replacement) of the support brackets; d) it enables positioning the gas distribution hose completely in a single plane to prevent bending the hose; e) components made of plastic have increased lifespans and can require less maintenance; f) the flow control device is easily accessible and can be replaced and/or repaired; g) etc.

As may now be better appreciated, the gas distribution system of the present disclosure can be advantageous in that it provides a system capable of performing various tasks, such as water aeration in aquaculture reservoirs, in a more efficient, more precise, more accurate, more reliable, more adjustable, more versatile, more adaptable, more ergonomic and/or more desirable manner, than what is possible with other existing conventional devices.

The present disclosure may be embodied in other specific forms without departing from the subject matter of the claims. The described example implementations are to be considered in all respects as being only illustrative and not restrictive. For example, the gas distribution system of the present disclosure could be used for other applications, such as de-icing operations, mixing operations, providing improved circulation and/or water lifting, among other possibilities. The present disclosure intends to cover and embrace all suitable changes in technology. The scope of the present disclosure is, therefore, described by the appended claims rather than by the foregoing description. The scope of the claims should not be limited by the implementations set forth in the examples but should be given the broadest interpretation consistent with the description as a whole.

As used herein, the terms "coupled", "coupling", "attached", "connected" or variants thereof as used herein can have several different meanings depending in the context in which these terms are used. For example, the terms coupled, coupling, connected or attached can have a mechanical connotation. For example, as used herein, the terms coupled, coupling, or attached can indicate that two elements or devices are directly connected to one another or connected to one another through one or more intermediate elements or devices via a mechanical element depending on the particular context.

In the present disclosure, an embodiment is an example or implementation of the gas distribution system, or "diffuser". The various appearances of "one embodiment," "an embodiment" or "some embodiments" do not necessarily all refer to the same embodiments. Although various features may be described in the context of a single embodiment, the features may also be provided separately or in any suitable combination. Conversely, although the diffuser may be described herein in the context of separate embodiments for clarity, it may also be implemented in a single embodiment. Reference in the specification to "some embodiments", "an embodiment", "one embodiment", or "other embodiments", means that a particular feature, structure, or characteristic described in connection with the embodiments is included in at least some embodiments, but not necessarily in all embodiments.

In the above description, the same numerical references refer to similar elements. Furthermore, for the sake of simplicity and clarity, namely, so as to not unduly burden the figures with several references numbers, not all figures contain references to all the components and features, and references to some components and features may be found in only one figure, and components and features of the present disclosure which are illustrated in other figures can be easily inferred therefrom.

In addition, although the optional configurations as illustrated in the accompanying drawings comprises various components and although the optional configurations of the diffuser as shown may consist of certain geometrical configurations as explained and illustrated herein, not all of these components and geometries are essential and thus should not be taken in their restrictive sense, i.e., should not be taken as to limit the scope of the present disclosure. It is to be understood that other suitable components and cooperation thereinbetween, as well as other suitable geometrical configurations may be used for the implementation and use of the diffuser, and corresponding parts, as briefly explained and as can be easily inferred herefrom, without departing from the scope of the disclosure.

The invention claimed is:

1. A gas distribution system for an aquaculture reservoir, comprising:
   a support structure having a support hub and support brackets connected to the support hub, the support hub having an internal chamber defined therein, and further has a first port and a second port in fluid communication with one another via the internal chamber, the first port being connectable to a gas source to receive gas therefrom;
   a flow control device provided within the internal chamber, the flow control device being selectively operable between a closed configuration, where fluid communication between the first and second ports is blocked, and an open configuration, where fluid communication between the first and second ports is allowed; and
   a gas distribution hose connected to the second port and supported by the support brackets, the gas distribution hose having a plurality of holes dispersed along a length thereof enabling fluid communication between the gas distribution hose and an environment surrounding the gas distribution hose, wherein the support hub comprises a hub body and a hub cap connectable to one another, the hub body comprising a plurality of bracket slots shaped and adapted to receive respective support brackets, and wherein connecting the hub cap to the hub body secures the support brackets within respective bracket slots.

2. The gas distribution system of claim 1, wherein the support structure further comprises an outer ring, and wherein the support brackets extend between the support hub and the outer ring.

3. The gas distribution system of claim 2, wherein the support hub is positioned substantially in the center of the outer ring, and the support brackets extend radially between the support hub and the outer ring.

4. The gas distribution system of claim 1, wherein the support brackets are independently and removably connected to the support hub.

5. The gas distribution system of claim 1, wherein the hub body includes a rabbeted edge, and the hub cap includes a circumferential edge shaped and adapted to engage the rabbeted edge when connecting the hub cap to the hub body.

6. The gas distribution system of claim 5, wherein the bracket slots are at least partially defined in the rabbeted edge, and wherein each support bracket includes a proximal end adapted to be inserted within respective bracket slots, and wherein the circumferential edge overhangs a portion of the proximal end to secure the proximal end within the bracket slot when connecting the hub cap to the hub body.

7. The gas distribution system of claim 1, wherein the support hub comprises an auxiliary port communicating with the internal chamber and provided with a removable seal, and wherein the removable seal is removable to allow access to the flow control device within the internal chamber.

8. The gas distribution system of claim 1, wherein the flow control device is a check valve comprising a ball and a biasing element configured to bias the ball in sealing engagement with internal surfaces of the internal chamber.

9. The gas distribution system of claim 8, wherein the biasing element is a spring.

10. The gas distribution system of claim 1, wherein the flow control device is operable between the closed configuration and the open configuration via fluid flow received from the gas source.

11. The gas distribution system of claim 1, wherein at least one of the hub body and the hub cap are made of plastic, and wherein at least one of the outer ring and the support brackets are made of metal.

12. The gas distribution system of claim 1, further comprising a hose adapter coupled between the second port and the gas distribution hose, the hose adapter comprising an adapter body provided with an inlet connectable to the second port and an outlet connectable to the gas distribution hose to establish fluid communication between the support hub and the gas distribution hose.

13. The gas distribution system of claim 12, wherein the inlet is defined vertically lower than the outlet along the adapter body.

14. The gas distribution system of claim 1, wherein the gas distribution hose is adapted to extend in a spiralling configuration around the support hub when supported by the support brackets.

15. The gas distribution system of claim 1, wherein the gas distribution hose is arranged in a single plane.

16. The gas distribution system of claim 15, wherein the support brackets are arranged in a common plane.

17. The gas distribution system of claim 16, wherein the single plane is substantially parallel to the common plane.

18. A fluid distribution system for aerating a reservoir, comprising:
a support structure having a support hub and support brackets connected to the support hub, the support hub having an internal passage connectable to a fluid source to receive fluid therefrom;
a flow control device operatively coupled to the support hub and being operable between a closed configuration and an open configuration to control fluid communication through the internal passage; and
a fluid distribution hose connected to the support hub and supported by the support brackets such that the fluid distribution hose extends around the support hub in a single plane, the fluid distribution hose being adapted to receive fluid from the fluid source via the internal passage of the support hub when the flow control device is operated in the open configuration for distribution of the fluid in an environment surrounding the distribution system.

19. The fluid distribution system of claim 18, further comprising a hose adapter comprising an adapter body provided with an inlet adapted to be fluidly connected to the support hub and an outlet, the distribution hose having a first end adapted to be coupled to the outlet to establish fluid communication between the support hub and the distribution hose, the outlet being defined along the adapter body such that the first end is positioned in the single plane.

20. A gas distribution system for an aquaculture reservoir, comprising:
a support structure having a support hub and support brackets connected to the support hub, the support hub having an internal chamber defined therein, and further has a first port and a second port in fluid communication with one another via the internal chamber, the first port being connectable to a gas source to receive gas therefrom;
a flow control device provided within the internal chamber, the flow control device being selectively operable between a closed configuration, where fluid communication between the first and second ports is blocked, and an open configuration, where fluid communication between the first and second ports is allowed; and
a gas distribution hose connected to the second port and supported by the support brackets, the gas distribution hose having a plurality of holes dispersed along a length thereof enabling fluid communication between the gas distribution hose and an environment surrounding the gas distribution hose,
wherein the flow control device is a check valve comprising a ball and a biasing element configured to bias the ball in sealing engagement with internal surfaces of the internal chamber.

21. A gas distribution system for an aquaculture reservoir, comprising:
a support structure having a support hub and support brackets connected to the support hub, the support hub having an internal chamber defined therein, and further has a first port and a second port in fluid communication with one another via the internal chamber, the first port being connectable to a gas source to receive gas therefrom;
a flow control device provided within the internal chamber, the flow control device being selectively operable between a closed configuration, where fluid communication between the first and second ports is blocked, and an open configuration, where fluid communication between the first and second ports is allowed;

a gas distribution hose connected to the second port and supported by the support brackets, the gas distribution hose having a plurality of holes dispersed along a length thereof enabling fluid communication between the gas distribution hose and an environment surrounding the gas distribution hose; and a hose adapter coupled between the second port and the gas distribution hose, the hose adapter comprising an adapter body provided with an inlet connectable to the second port and an outlet connectable to the gas distribution hose to establish fluid communication between the support hub and the gas distribution hose, wherein the inlet is defined vertically lower than the outlet along the adapter body.

22. A gas distribution system for an aquaculture reservoir, comprising:

a support structure having a support hub and support brackets connected to the support hub, the support hub having an internal chamber defined therein, and further has a first port and a second port in fluid communication with one another via the internal chamber, the first port being connectable to a gas source to receive gas therefrom;

a flow control device provided within the internal chamber, the flow control device being selectively operable between a closed configuration, where fluid communication between the first and second ports is blocked, and an open configuration, where fluid communication between the first and second ports is allowed; and a gas distribution hose connected to the second port and supported by the support brackets, the gas distribution hose having a plurality of holes dispersed along a length thereof enabling fluid communication between the gas distribution hose and an environment surrounding the gas distribution hose, wherein the gas distribution hose is adapted to extend in a spiraling configuration around the support hub when supported by the support brackets.

* * * * *